United States Patent
Snyder et al.

(10) Patent No.: US 10,775,046 B2
(45) Date of Patent: Sep. 15, 2020

(54) FUEL INJECTION ASSEMBLY FOR GAS TURBINE ENGINE

(71) Applicant: Rolls-Royce North American Technologies Inc., Indianapolis, IN (US)

(72) Inventors: Douglas J. Snyder, Carmel, IN (US); Patrick C. Sweeney, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 405 days.

(21) Appl. No.: 15/787,252

(22) Filed: Oct. 18, 2017

(65) Prior Publication Data

US 2019/0113233 A1 Apr. 18, 2019

(51) Int. Cl.
*F23R 3/28* (2006.01)
*F23R 3/00* (2006.01)
*F02C 7/224* (2006.01)

(52) U.S. Cl.
CPC .............. *F23R 3/283* (2013.01); *F02C 7/224* (2013.01); *F23R 3/005* (2013.01); *F05D 2260/213* (2013.01); *F23R 2900/00017* (2013.01)

(58) Field of Classification Search
CPC .... F02C 6/04; F02C 6/08; F02C 7/222; F02C 7/224; F02C 7/24; F02C 7/25; F02C 9/18; F23R 3/005; F23R 3/283; F23R 3/28; F23R 3/20; F23R 3/23; F23R 2900/00017; F01D 25/12; F01D 25/24; F05D 2260/213; F02K 3/10

USPC .................................. 60/730, 736, 760, 266
See application file for complete search history.

(56) References Cited

U.S. PATENT DOCUMENTS

| 3,535,875 | A |   | 10/1970 | Litke et al. |   |
|---|---|---|---|---|---|
| 4,120,150 | A | * | 10/1978 | Wakeman | F02C 7/185 60/39.091 |
| 4,229,944 | A |   | 10/1980 | Weiler |   |
| 4,312,185 | A | * | 1/1982 | Nash | F02C 7/222 60/262 |
| 5,036,657 | A | * | 8/1991 | Seto | F02C 7/222 60/39.281 |
| 5,351,477 | A |   | 10/1994 | Joshi et al. |   |
| 5,735,115 | A |   | 4/1998 | Maghon |   |
| 6,993,913 | B2 |   | 2/2006 | Kobayashi et al. |   |
| 8,479,518 | B1 |   | 7/2013 | Chen |   |
| 8,820,047 | B2 |   | 9/2014 | Saito et al. |   |
| 2002/0069647 | A1 | * | 6/2002 | Mayersky | F02C 7/222 60/796 |
| 2004/0040306 | A1 |   | 3/2004 | Prociw et al. |   |
| 2009/0110537 | A1 | * | 4/2009 | Jain | F01D 25/14 415/2.1 |
| 2010/0071667 | A1 |   | 3/2010 | Hicks et al. |   |

(Continued)

FOREIGN PATENT DOCUMENTS

| EP | 2677240 A2 | 12/2013 |
| EP | 3075983 A1 | 10/2016 |

(Continued)

*Primary Examiner* — Todd E Manahan
*Assistant Examiner* — Sean V Meiller
(74) *Attorney, Agent, or Firm* — Barnes & Thornburg LLP

(57) ABSTRACT

Fuel injection assemblies for a gas turbine engine includes a fuel injector and heat exchanger in communication via a fuel line cavity to provide heated fuel for combustion.

20 Claims, 6 Drawing Sheets

(56) References Cited

U.S. PATENT DOCUMENTS

| | | |
|---|---|---|
| 2011/0005232 A1 | 1/2011 | Williams et al. |
| 2011/0107769 A1 | 5/2011 | Stevenson et al. |
| 2013/0219915 A1 | 8/2013 | Prociw et al. |
| 2014/0060057 A1 | 3/2014 | John et al. |
| 2014/0238036 A1 | 8/2014 | Uhm et al. |
| 2014/0327194 A1 | 11/2014 | Matusewicz et al. |
| 2015/0000291 A1 | 1/2015 | Smith et al. |
| 2016/0290290 A1 | 10/2016 | Lo |
| 2017/0204812 A1 * | 7/2017 | Grande Fernandez ............... F02M 26/29 |
| 2017/0363094 A1 * | 12/2017 | Kumar ............... F02C 3/04 |

FOREIGN PATENT DOCUMENTS

| | | |
|---|---|---|
| GB | 2476253 A | 6/2011 |
| WO | 2015054136 A1 | 4/2015 |
| WO | 2015112215 A2 | 7/2015 |

* cited by examiner

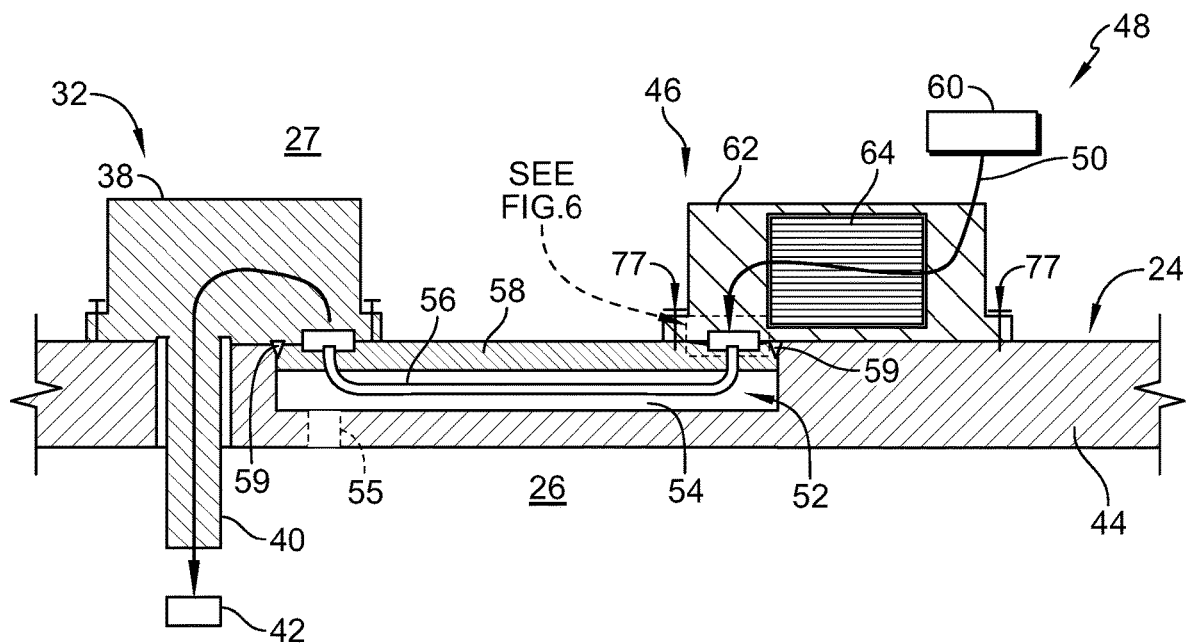
FIG. 3
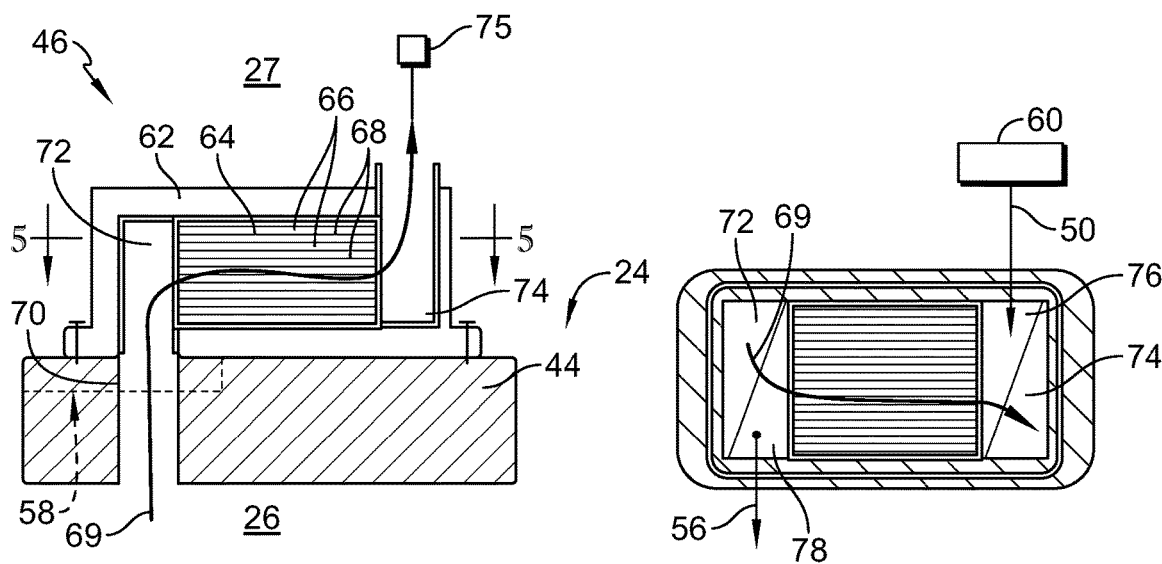
FIG. 4
FIG. 5

FUEL INJECTION ASSEMBLY FOR GAS TURBINE ENGINE

BACKGROUND

The present disclosure relates generally to gas turbine engines, and more specifically to gas turbine engines including fuel providing assemblies.

Gas turbine engines are used to power aircraft, watercraft, electric generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, and/or propeller. The exhaust products from gas turbine engines are typically expelled to atmosphere having considerable temperature.

Heating fuel before combustion can provide performance gains but can promote dangerous conditions of the fuel.

SUMMARY

The present disclosure may comprise one or more of the following features and combinations thereof.

According to an aspect of the present disclosure a fuel injection assembly for a gas turbine engine may include a high pressure casing defining a high pressure area through which pressurized fluids are passed to a combustion chamber of the gas turbine engine, at least one fuel injector including a head mounted to the high pressure casing of the gas turbine engine, and a stem extending from the head into the high pressure area, and a nozzle connected with the stem to inject fuel into the combustion chamber, at least one fuel-cooled heat exchanger mounted to the high pressure casing and arranged in fluid communication to receive fuel from a fuel supply of the gas turbine engine, the at least one heat exchanger including a core adapted to pass fuel in thermal communication with a heat source to receive heat, and a fuel cavity defined by the high pressure casing. The fuel cavity may be arranged to receive heated fuel from the at least one heat exchanger and to communicate heated fuel with the head of the at least one fuel injector for injection into the combustion chamber.

In some embodiments, the fuel cavity may be formed as a depression within a wall of the high pressure casing. The high pressure casing may include a cap plate enclosing the fuel cavity. In some embodiments, the fuel cavity may include a conduit in communication with each of the at least one heat exchanger and the at least one fuel injector to communicate fuel therebetween, the conduit extending within the fuel cavity of the high pressure casing between the at least one heat exchanger and the at least one fuel injector.

In some embodiments, the cap plate may include at least one opening in communication with the conduit to pass fuel. At least one of the at least one heat exchanger and the at least one head of the fuel injector may be mounted at least partially on the cap plate. In some embodiments, at least one of the at least one heat exchanger and the at least one fuel injector is mounted to the high pressure casing on a low pressure side.

In some embodiments, the at least one heat exchanger may include a fuel passage and an air passage arranged in thermal communication with each other. The air passage may be arranged to receive hot, high pressure air from the high pressure area defined by the high pressure casing for providing heat to fuel within the fuel passage.

In some embodiments, the at least one fuel heat exchanger may include at least two fuel heat exchangers and the at least one fuel injector may include at least four fuel injectors each in communication to receive fuel from one of the at least two fuel heat exchangers. The fuel injectors may be arranged circumferentially about the combustion chamber in alternating sequence such that adjacent ones of the fuel injectors receive fuel from different ones of fuel heat exchangers.

In some embodiments, the at least one fuel heat exchanger may include at least two fuel heat exchangers. The assembly may further include a valve arranged to regulate the flow of air through each of the at least two heat exchangers.

According to another aspect of the present disclosure, a gas turbine engine may include an engine core assembly including a compressor for compressing air, a combustor for combusting a mixture of fuel and pressurized air from the compressor, and turbine for expanding combustion products to provide mechanical force, the combustor including a high pressure casing defining a high pressure area and having a combustion chamber arranged within the high pressure area, at least one fuel injector including a head mounted to the high pressure casing and a stem extending from the head into the high pressure casing, and a nozzle disposed on the stem to inject fuel into the combustion chamber, at least one fuel-cooled heat exchanger mounted to the high pressure casing and arranged in fluid communication to receive fuel from a fuel supply of the gas turbine engine, the at least one heat exchanger including a core adapted to pass fuel in thermal communication with a heat source to receive heat, and a fuel cavity defined within a wall of the high pressure casing. The fuel cavity may be arranged to receive heated fuel from the at least one heat exchanger and to communicate heated fuel with the at least one fuel injector for injection into the combustion chamber.

In some embodiments, the fuel cavity may be formed as a depression on the wall of the high pressure casing. The high pressure casing may include a cap plate enclosing the fuel cavity. In some embodiments, the fuel cavity may include a conduit in communication with each of the at least one heat exchanger and the at least one fuel injector to communicate fuel therebetween, the conduit extending within the fuel cavity of the high pressure casing between the at least one heat exchanger and the at least one fuel injector.

In some embodiments, the cap plate may include at least one opening in communication with the conduit to pass fuel. In some embodiments, at least one of the at least one heat exchanger and the at least one head of the fuel injector may be mounted at least partially on the cap plate.

In some embodiments, at least one of the at least one heat exchanger and the at least one fuel injector may be secured to the high pressure casing on a low pressure side. The at least one heat exchanger may include a fuel passage and an air passage arranged in thermal communication with each other. The air passage may be arranged to receive hot, high pressure air from the high pressure area defined by the high pressure casing for providing heat to fuel within the fuel passage.

In some embodiments, the at least one fuel heat exchanger may include at least two fuel heat exchangers and the at least one fuel injector may include at least four fuel injectors each in communication to receive fuel from one of the at least two fuel heat exchangers. The fuel injectors may be arranged about the combustion chamber in alternating sequence such that adjacent ones of the fuel injectors receive fuel from different ones of fuel heat exchangers. In some embodiments, the at least one fuel heat exchanger may include at least two fuel heat exchangers. The assembly may further include a valve arranged to regulate the flow of air through each of the at least two heat exchangers.

These and other features of the present disclosure will become more apparent from the following description of the illustrative embodiments.

BRIEF DESCRIPTION OF THE DRAWINGS

FIG. 3 is a closer partial cross-sectional view of a portion of the fuel injector assembly of FIG. 2 showing that the fuel injector assembly includes a fuel line cavity that fluidly connects the heat exchanger with the fuel injector to provide heated fuel and showing that the fuel line cavity is defined within the outer casing of the combustor and houses a fuel line extending between the heat exchanger and the fuel injector to reduce risks associated with heated fuel;

FIG. 4 is a partial cross-sectional view of the heat exchanger of the fuel injector assembly of FIG. 3, showing that the heat exchanger includes a housing secured to the outer casing and a core having air side and fuel side passages in thermal communication with each other;

FIG. 5 is another cross-sectional view of the heat exchanger of the fuel injector assembly of FIGS. 4 and 5, taken along the line 5-5 as shown in FIG. 4, showing that (hot) compressed air is directed through the air side passages by air plenums and fuel is directed through the fuel side passages by fuel plenums to provide heat to the fuel;

DETAILED DESCRIPTION OF THE DRAWINGS

Figure 1:
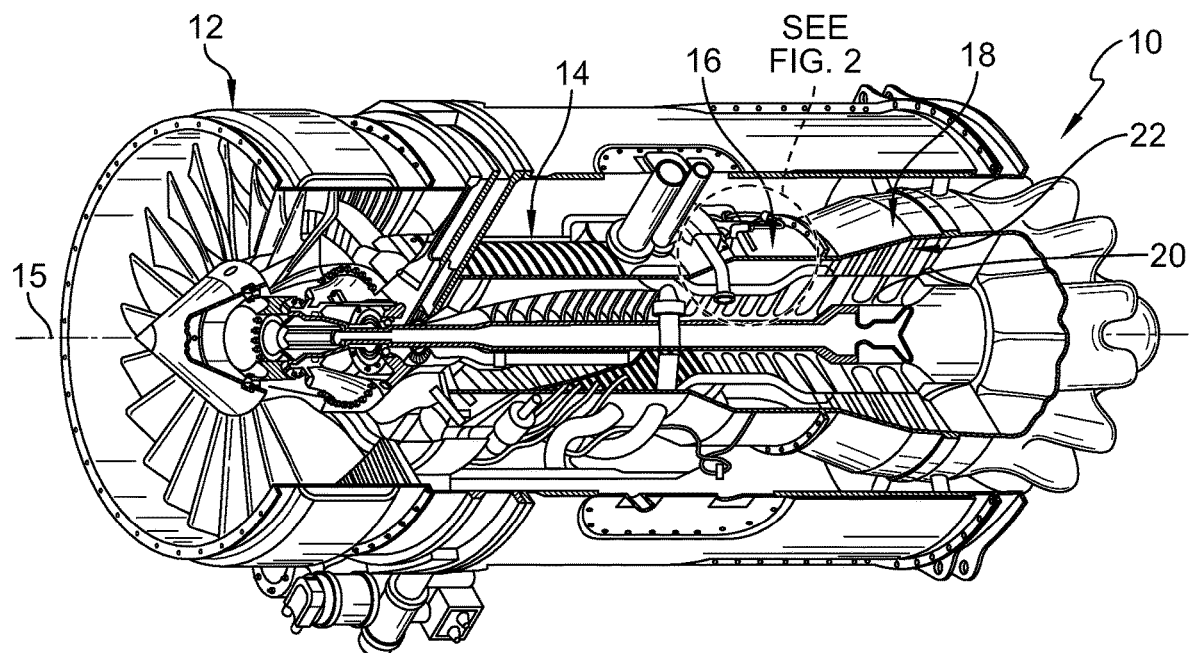
FIG. 1 is an perspective view of a gas turbine engine having a portion cut away to show a compressor compresses air for mixing with fuel for combustion in a combustor to produce combustion products for expansion across a turbine to provide mechanical power.

For the purposes of promoting an understanding of the principles of the disclosure, reference will now be made to a number of illustrative embodiments illustrated in the drawings and specific language will be used to describe the same.

An illustrative gas turbine engine 10 is shown in FIG. 1 having a portion cut away for descriptive purposes. The gas turbine engine 10 illustratively includes a fan 12, a compressor 14, a combustor 16, and a turbine 18 arranged to provide motive power. The fan 12 and the compressor 14 are driven by the turbine 18 to provide air for engine use. The compressor 14 compresses and delivers air to the combustor 16. The combustor 16 mixes fuel with the compressed air received from the compressor 14 and ignites the fuel. From the combustor 16, the hot, high-pressure exhaust products of the combustion reaction are directed into the turbine 18. The turbine 18 illustratively includes a rotor 20 and blades 22 extending radially from the rotor 20 to receive expansion of the exhaust products causing the rotor 20 to rotate about a central axis 15 and to drive the compressor 14 and the fan 12. As used herein, directional references generally relate to the central axis 15 of the engine 10. In some embodiments, any suitable configuration of turbomachinery components including a combustor and turbine may be applied, for example but without limitation, turbo jet configurations without a fan.

Preheating fuel before combustion within the combustor 16 can provide performance and/or efficiency gains. One potential source of waste energy which can be used to supply heat to the fuel is hot compressed air (e.g., discharge and/or bleed air) from the compressor. Compressed air from the compressor generally has significant temperature due to the heat from compression. The hot compressed air can transfer heat to the fuel by heat exchange and resulting in relatively cool compressed air. The cooled compressed air can be used as cooling medium for other areas of the gas turbine engine, for example, for cooling within the turbine 18. However, heating fuel can generally create risks, such as the risk of inadvertent combustion. Performing such air-to-fuel heat exchange within protected areas and near to the location of fuel input for combustion can avoid and/or reduce the risks associated with heating fuel.

Figure 2:
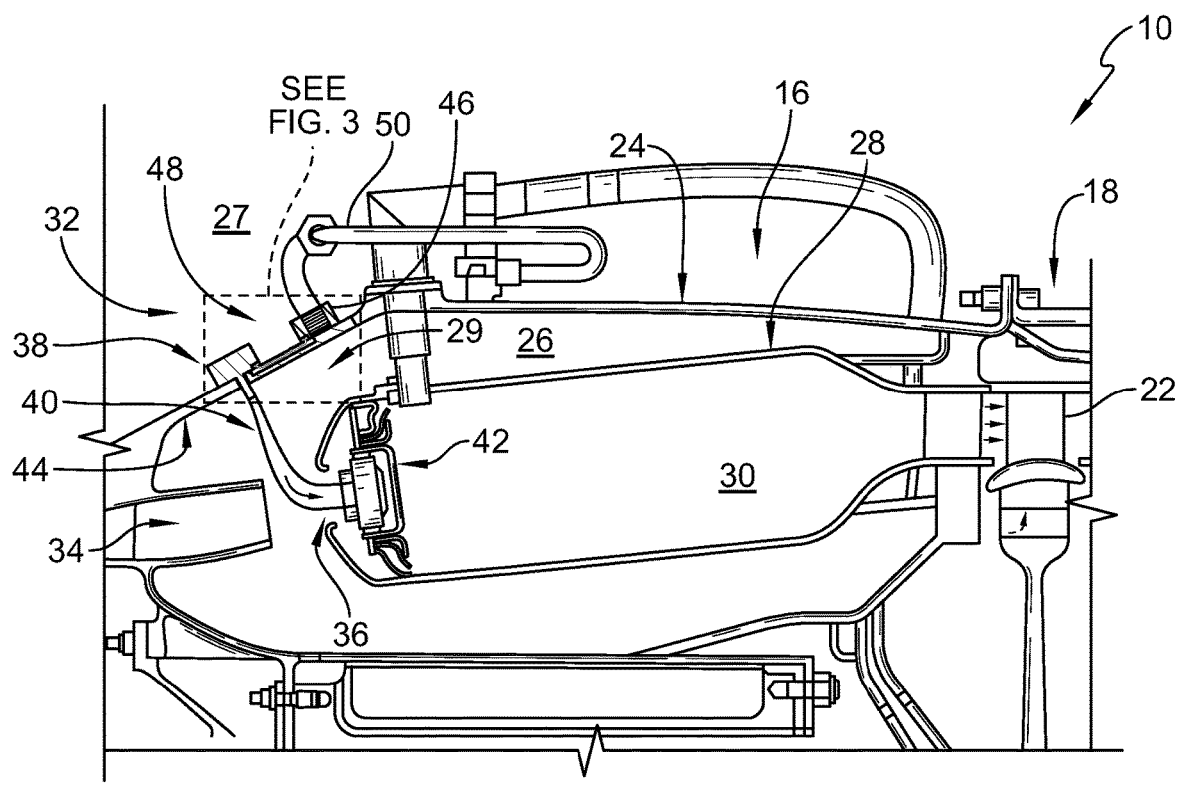
FIG. 2 is closer side elevation view of a portion of the gas turbine engine of FIG. 1 showing that the combustor includes a casing defining a high pressure cavity and a lower pressure area, the high pressure cavity having a combustion chamber defined therein, and showing that a fuel injector assembly includes a fuel injector that extends from outside the casing to the combustion chamber to provide fuel for combustion and a fuel-cooled heat exchanger for providing preheated fuel to the fuel injector.

As shown in the illustrative cross-section of FIG. 2, the combustor 16 includes an outer casing 24 defining a cavity 26 therein. The cavity 26 of the outer casing 24 provides a high-pressure plenum, distinct from a low pressure area 27, for high-pressure fluids flowing within the combustor 16. The cavity 26 includes a compressed air inlet 34 for receiving compressed air from the compressor 14. The combustor 16 illustratively includes a combustion liner 28 defining a combustion chamber 30 for combustion of the fuel and air mixture. A plurality of circumferentially spaced fuel injectors 32 are illustratively arranged about the combustion chamber 30 to provide fuel for combustion.

As shown in FIG. 2, the fuel injectors 32 are illustratively mounted to the outer casing 24 and extend radially to an inlet 36 of the combustion liner 28. The fuel injectors 32 penetrate through the outer casing 24 to enter into the cavity 26. Each fuel injector 32 illustratively includes a head 38 and a stem 40 extending from the head 38 to a nozzle 42 arranged to inject fuel into the combustion chamber 30. The head 38 is mounted to a wall 44 of the outer casing 24 and the stem 40 penetrates through the outer casing 24 into the cavity 26 for connection with the nozzle 42.

In the illustrative embodiment as shown in FIG. 2, a heat exchanger 46 is provided with the fuel injector 32 as a fuel injector assembly 48. The heat exchanger 46 is mounted to the outer casing 24 to heat fuel prior to injection for combustion. The heat exchanger 46 is arranged in fluid communication with the head 38 of the fuel injector 32 to provide heated fuel. The heat exchanger 46 is illustratively formed as a fuel-cooled heat exchanger fluidly connected to receive fuel from a line 50 of a fuel supply to transfer heat to the fuel before injection into the combustion chamber 30 by the fuel injector 32.

Heating combustible fuel can present challenges including the potential for premature ignition. In adapted use of gas turbine engines for aerospace applications, fuel in the area of the fuel injectors can reach near-critical conditions. Maintaining safe and effective fuel heating can be of particular concern. By carefully controlling the area in which heat transfer to the fuel occurs, including protecting the pathway along which heated fuel may traverse, impacts from such risks can be reduced. For example, by compartmentalizing the heat transfer to the fuel and/or maintaining heated fuel within the high pressure areas, the potential impact of inadvertent combustion can be contained.

Referring now to FIG. 3, the fuel injector assembly 48 is shown to include the fuel injector 32 and the heat exchanger 46 in fluid communication via a fuel line cavity 52 to provide risk mitigation regarding the heated fuel. The heat exchanger 46 is illustratively secured to the outer casing 24 and positioned outside of the cavity 26. Arranging the heat exchanger 46 outside of the cavity 26 can provide less obstruction within the high-pressure areas of the combustor 16, including cavity 26. The stem 40 of the fuel injector 32 extends through the outer casing 24 to deliver fuel to the nozzle 42.

As shown in the illustrative embodiment of FIG. 3, the fuel line cavity 52 illustratively includes a chamber 54 through which a fuel line 56 extends to communicate fuel from the heat exchanger 46 to the fuel injector 32. The chamber 54 is illustratively defined within the wall 44 of the outer casing 24. Integration of the chamber 54 within the wall 44 itself maintains heated fuel within the outer casing 24 and outside of the low pressure area 27 before delivery to the combustor 16. The fuel line cavity 52 includes a cap seal 58 arranged to seal the chamber 54 from the low pressure area 27.

The chamber 54 is illustratively formed as a depression within the wall 44 and the cap seal 58 encloses the chamber 54. The cap seal 58 is illustratively attached to the wall 44 by welds 59 to provide a fluid tight chamber relative to low pressure area 27, but in some embodiments may be secured by any suitable manner, with or without fluid sealing as to area 27. The chamber 54 may optionally be in fluid communication with the cavity 26 via equalizing port 55 (for example, when the chamber 54 is fluidly sealed by the cap seal 58). The fuel line 56 illustratively penetrates through the chamber 54 to provide fluid communication between the fuel injector 32 and the heat exchanger 46. The heat exchanger 46 receives fuel from a fuel supply 60 through supply line 50 for heat exchange with compressed air.

As shown in the illustrative embodiment of FIG. 4, the heat exchanger 46 includes a housing 62 and a core 64. The core 64 includes fuel side passages 66 receiving fuel from the supply line 50 and air side passages 68 receiving compressed air. Fuel side passages 66 and air side passages 68 are arranged in thermal communication with each other to transfer heat to the fuel within the fuel side passages 66 for combustion in the combustion chamber 30. Passages 66,68 are illustratively shown arranged in alternating sequence with each other, but in some embodiments, may have any suitable arrangement for heat exchange. As shown in FIG. 4, a stream of compressed air 69 passes through the air side passages 68 (with the stream of fuel omitted for clarity) to provide heat to fuel within the fuel side passages 68. As shown in FIG. 5, fuel plenums 76, 78 communicate fuel with the fuel side passages 66.

Returning briefly to FIG. 3, the housing 62 of the heat exchanger 46 is illustratively secured to the outer casing 24. Fasteners 77 extend through the housing 62 and connect with the outer casing 24 to provide a closed structure. In the illustrative embodiment, the housing 62 is secured, at least partially, to the cap seal 58 as a portion of the wall 44. The interface between the housing 62 and the cap seal 58 is discussed in additional detail below. The head 38 of the fuel injector 38 is similarly secured with the casing 24 using fasteners 77.

In the illustrative embodiment as shown in FIG. 4, the air stream 69 passes through a port 70 defined through the wall 44 into a plenum 72. The plenum 72 fluidly connects with each of the air side passages 68 to provide compressed air as a heat source for the fuel. The air of the air steam 69 is illustratively provided from the cavity 26 and is passed through the core 64 to another plenum 74 by pressure differential of the high pressure cavity 26 within its downstream users 75 (e.g., portions of turbine 18 for cooling by the cooled air). In the illustrative embodiment, the port 70 is distinct from the fuel line cavity 52, but optionally may be formed as part of the fuel line cavity 52, for example, as a port within the cap seal 58 communicating with the chamber 54 to receive compressed air from the cavity 26 through port 55. In some embodiments, any suitable source of heat may be passed through the passages 68 to heat the fuel.

Figure 6:
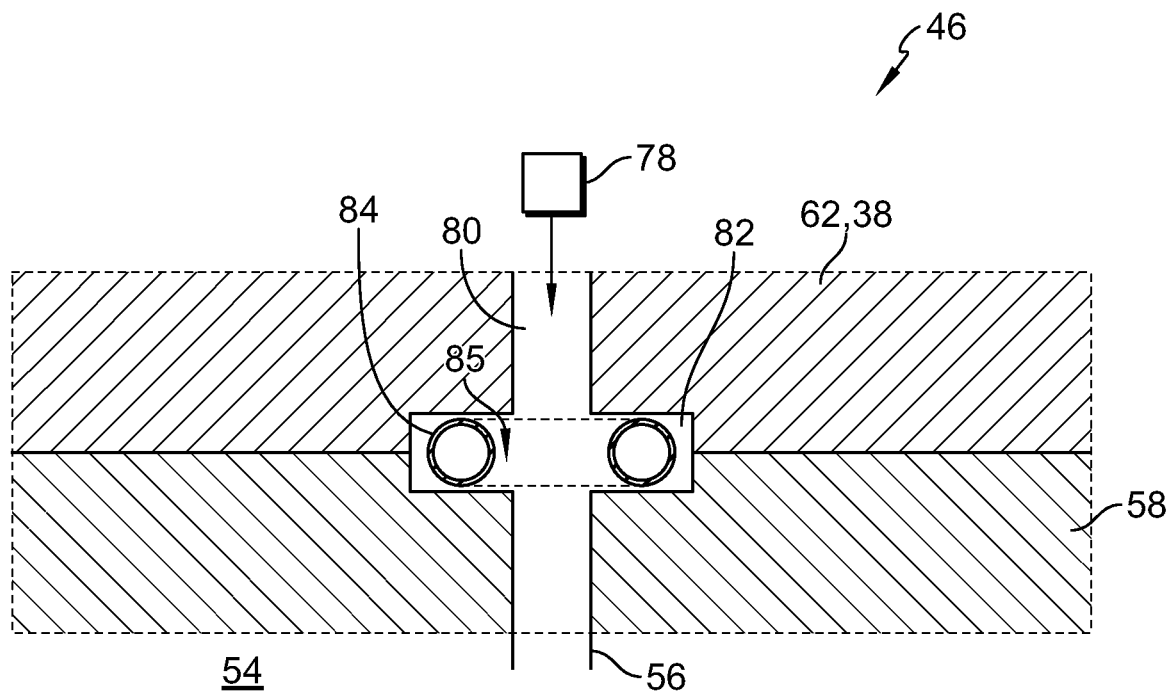
FIG. 6 is a closer view of a portion of the fuel injector assembly of FIG. 3 at an interface between the heat exchanger and the outer casing, showing that an O-ring seal is disposed within a seal cavity to prevent leakage while permitting fuel to flow through the seal.

As shown in the illustrative embodiment of FIG. 6, the housing 62 and the cap seal 58 together define a passageway 80 that receives fuel from the plenum 78. A seal cavity 82 is defined partly by each of the housing 62 and the cap seal 58 for housing a seal 84 to prevent leakage of fuel. The seal 84 is illustratively embodied as an O-ring seal, preferably metal, that is held between surfaces of the housing 62 and the cap seal 58 to provide a fluid seal. Fuel can flow through the passageway 80 and through the center 85 of the seal 84 into the fuel line 56.

Figure 7:
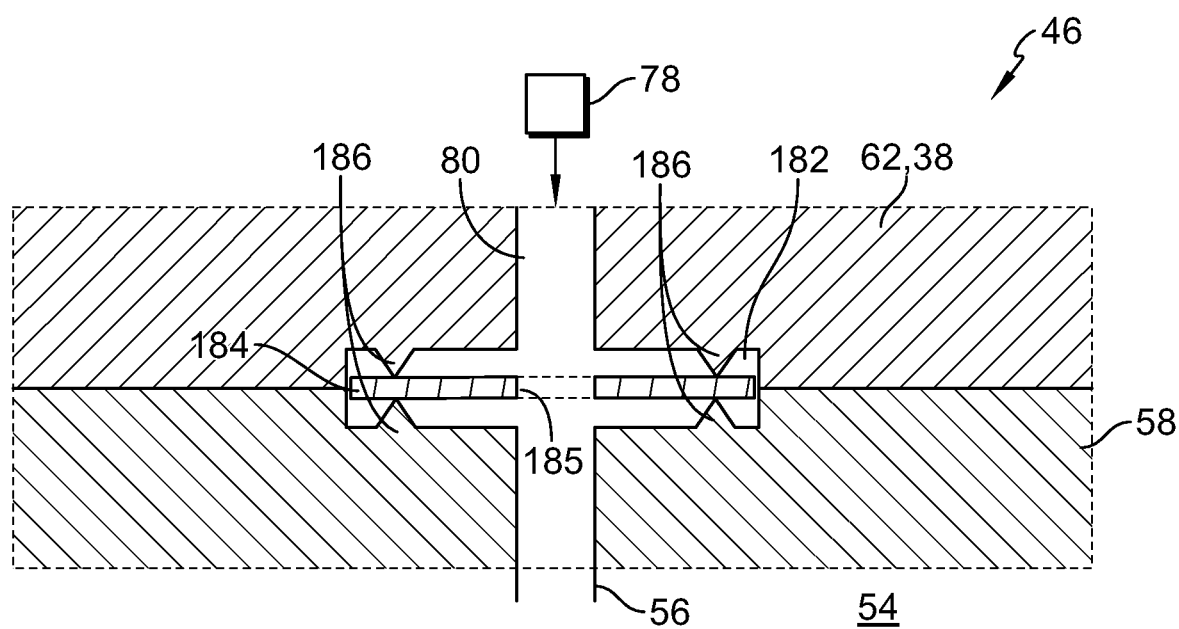
FIG. 7 is a another embodiment of the portion of the fuel injector assembly of FIG. 6 at the interface between the heat exchanger and the outer casing, showing that a knife seal is disposed within a seal cavity having knife edges defined by each of the housing of the heat exchanger and the outer casing to prevent leakage.

As shown in FIG. 7, another illustrative embodiment of the interface between the housing 62 and the cap seal 58 includes a knife seal configuration including a seal 184 and seal edges 186 within a seal cavity 182. The seal edges 186 are illustratively formed as projections of each of the housing 62 and cap seal 58 which extend to contact the seal 184 to form a fluid tight seal. The seal edges 186 of each of the housing 62 and cap seal 58 encircle a hollow center 185 of the seal 184 to provide a fluid tight pathway for fuel. In the illustrative embodiment, the seal 184 is formed as a crushable disk to promote fluid tight sealing. The passageway 80 passes fuel through the seal 184 to the fuel line 56. The interface details of the embodiments, of FIGS. 7 and 8 apply equally to the interface between the head 38 and the wall 44 with the heat exchanger 46 being the source of fuel through the fuel line cavity 52, but in some embodiments, different interface configurations may be applied to each of the heat exchanger 46 and fuel injector 32. In some embodiments, any suitable interface configuration may be used between the wall and either of the fuel injector 32 and the heat exchanger 46. In some embodiments, the seal cavity 82 may be at least partially defined in the wall 44 in lieu of the cap seal 58 while passageway 80 communicates with the line 56 within the chamber 54. In some embodiments, as discussed herein with respect to FIG. 12, the line 56 may be formed as an integral part of the wall 44 such that the chamber 54 forms the pathway for fuel flow being fluidly sealed by the cap seal 58.

Figure 8:
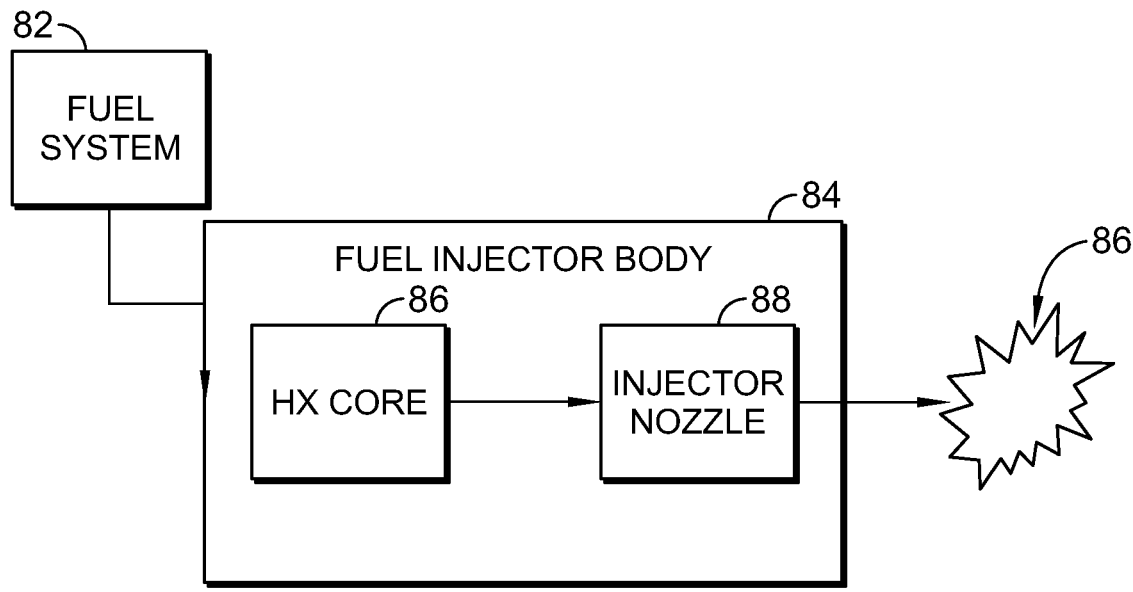
FIG. 8 is a diagrammatic view of an arrangement of a fuel injector having a heat exchanger core arranged within a body of the fuel injector and upstream of an injector nozzle.

As shown in FIG. 8, a diagram of a fuel injector assembly is shown in which a fuel system 82 provides fuel to a fuel injector body 84 for combustion 86 within a combustor. In this arrangement, the fuel injector body 84 comprises a heat exchanger core 86 therein for heating fuel prior to passage through the injector nozzle 88. Such arrangement includes a single heat exchange core 86 for each injector nozzle 88.

Figure 9:
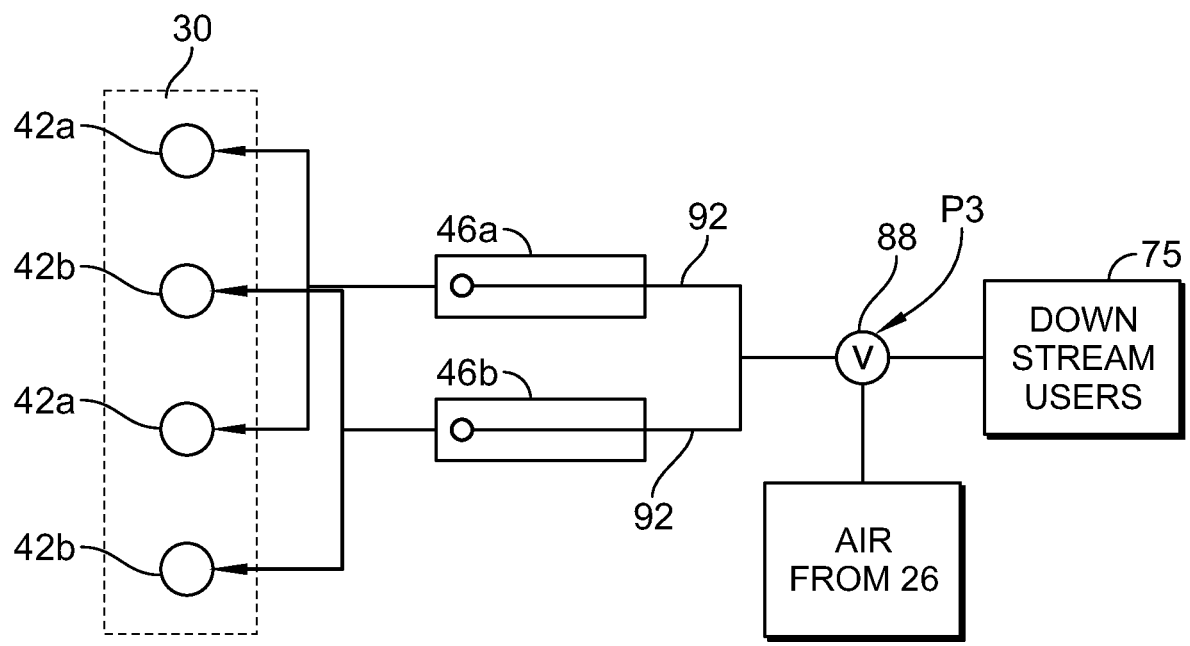
FIG. 9 is a diagrammatic view of an arrangement of the fuel injector assembly of FIGS. 2-5 having a pair of heat exchangers each arranged to provide heated fuel to a pair of nozzles within the combustion chamber, and showing that a control valve is arranged to regulate the flow of fuel for each of the heat exchangers.

As shown in the illustrative embodiment of FIG. 9, as opposed to the single and integral arrangement as shown in FIG. 8, a pair of fuel-cooled heat exchangers 46a,46b are shown providing fuel through fuel injectors (omitted) to a number of fuel nozzles 42a,42b. Each heat exchanger 46a, 46b provides heated fuel to a pair of fuel nozzles 42a,42b, respectively. The fuel nozzles 42a,42b are arranged in alternating sequence such that adjacent ones of the fuel nozzles 42a,42b receive fuel from different ones of fuel heat exchangers 46a,46b. For example, the fuel nozzles 42a,42b are arranged annularly about the combustion chamber 30, in alternating sequence circumferentially. By alternating the placement of the fuel nozzles 42a,42b, if a single heat exchanger 46a,46b were out of service, the effects within the combustion chamber 30 are more evenly distributed.

In the illustrative embodiment as shown in FIG. 9, a valve 88 governs the amount of heat source fluid through the heat exchangers 46a,46b. The valve 88 is embodied as a flow control valve and is simultaneously connected with compressed air conduits 92 from each heat exchanger 46a,46b to control the compressed air flow from the cavity 26 through the heat exchangers 46a,46b to the downstream users 75 (e.g., turbine 18). The valve 88 illustratively connects with a hot stream of air from the high pressure cavity 26 that has not passed through the heat exchangers 46a,46b for mixing with the cooled compressed air from the heat exchangers 46a,46b and can regulate the temperature of the stream sent to downstream users 75 by adjusting the ratio of cooled and uncooled air. Precise control of the compressed air through the heat exchangers 46a,46b as the heat source can assist in preventing overheating of the fuel during the full range of combustion activity from 0-100% of load. Application of a single valve can reduce component quantities and permit coordinated air control. In some embodiments, the valve 88 may provide control only for the cooled compressed air flow from the heat exchangers 46a,46b and the hot compressed air supply control and/or mixing may be provided by other means. The illustrative embodiment describes a single valve, a pair of heat exchangers, and a pair of nozzles per heat exchanger, but in some embodiments, may have any suitable number of such features.

Figure 10:
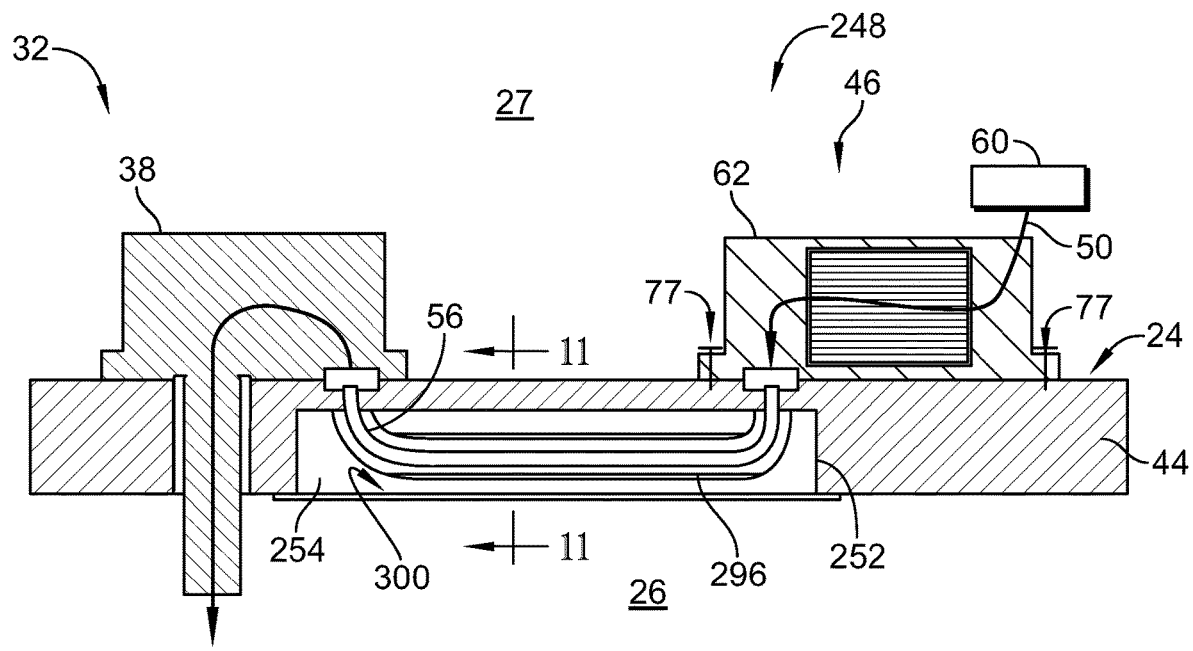
FIG. 10 is a closer cross-sectional view of a portion of the fuel injector assembly of FIG. 2 showing another embodiment of the fuel injector assembly includes a fuel line cavity including a chamber that is defined within the outer casing on a radially inner side of the wall of the combustor to reduce risks associated with heating the fuel.

As shown in FIG. 10, another illustrative embodiment of the fuel injector assembly 248 includes a fuel line cavity 252. The fuel injector assembly 248 is otherwise similar to fuel injector assembly 48, and the description and drawings of fuel injector assembly 48 applies equally to fuel injector assembly 248, unless conflicting with the specific disclosure of fuel injector assembly 248. Unlike the fuel line cavity 252 having the chamber 54 defined as a depression formed on a radially outer side of the wall 44 of the outer casing 24 with the cap seal 58 closing off the radially outer opening, the fuel line cavity 252 includes a chamber 254 formed as a depression on a radially inner side of the wall 44. The fuel line cavity 252 fluidly connects the heat exchanger 46 and fuel injector 32 to communicate fuel through fuel line 56.

Figure 11:
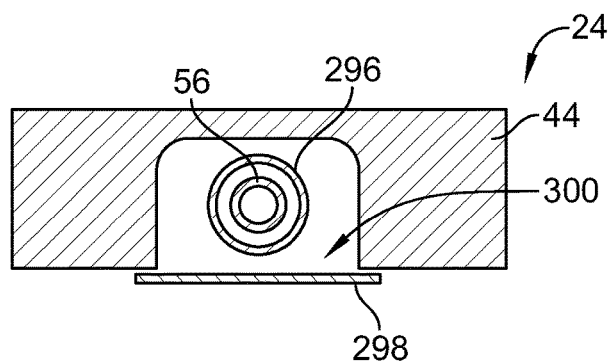
FIG. 11 is a cross-sectional view of the fuel injector assembly of FIG. 10, taken along the line 11-11, showing that a heat shield is arranged around the fuel line and another heat shield is disposed to cover the chamber to reduce heat effects on the fuel line

Fuel line 56 illustratively includes a heat shield 296 reducing heat transfer (e.g., radiation) to the fuel along line 56. As shown in FIG. 11, the heat shield 296 is illustratively formed as a tube shield encircling the line 56. The fuel line cavity 252 may optionally include a heat shield 298 enclosing the radial opening 300 of the chamber 254 to further reduce heat radiation. The heat shield 298 illustratively covers but does not seal the chamber 254 to permit pressure equalization with cavity 26.

Figure 12:
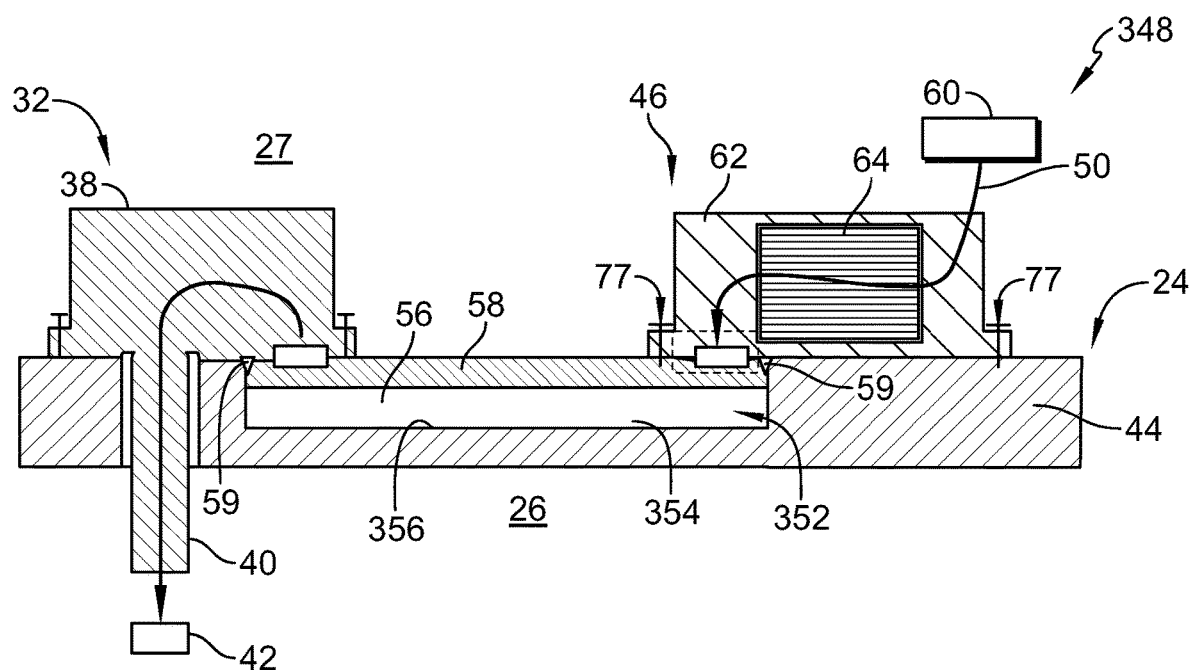
FIG. 12 is a closer cross-sectional view of a portion of the fuel injector assembly of FIG. 2 showing another embodiment of the fuel injector assembly includes a fuel line cavity including a chamber that itself forms a fuel pathway to reduce risks associated with heating the fuel.

As previously mentioned, in the illustrative embodiment as shown in FIG. 12, another fuel injector assembly 348 includes a fuel line cavity 352 including a line 356 formed as an integral part of the wall 44 such that a chamber 354 forms the pathway for fuel flow being fluidly sealed by the cap seal 58. The fuel injector assembly 348 is otherwise similar to fuel injector assemblies 48,248 and the description and drawings of fuel injector assemblies 48, 248 applies equally to fuel injector assembly 348, unless conflicting with the specific disclosure of fuel injector assembly 348.

Cooperative fuel-cooled heat exchanger/fuel injector arrangements can reduce the volume of high temperature fuel, contain hot fuel within high pressure area, can enable the ability to shut down an individual fuel injector without completely shutting down the engine's combustion process, and/or can enable the ability to replace a bad heat exchanger/ injector as a Field Replaceable Unit (FRU). For example, such arrangements can reduce the required amount of piping/tubing necessary to route hot fuel and hot fluids. Challenges of the such arrangements may include limited space for the heat exchanger core and managing the number of flow control devices, caused by each injector acting independently from the other.

The present disclosure includes two or more of these heat exchangers that may be combined and placed on a separate combustor case mounting pad. Multiple heat exchangers may be flow controlled by a single valve. For example, the number of fuel valves may be reduced by a factor of two, while still retaining the ability to shut down any fuel air heat exchanger during flight. The fuel injectors connected to any heat exchanger may be interlaced with other fuel injectors in order to even out the combustion in the combustor should fuel flow to any heat exchanger be stopped. The present disclose can include designs to allow reduced valves for controlling the flow of the hot fluid (e.g., reduction by ¼). Layouts may allow a reduction in the amount of airflow through the heat exchanger, by directly drawing hot air from the combustor casing (outer casing 24). This can enable the limiting of the heat load to the fuel and therefore the peak temperature the fuel sees during operation. The air valve may take a portion of the cooled air and a portion of uncooled P3 air to permit dilution of cooled air with hot air. In some embodiments, two valves may be applied to achieve this function. Although certain arrangements have been illustrated using four fuel injectors, the arrangement may be implemented and/or repeated for a full set of injectors (which may or may not include multiple combustion chambers). In some embodiments, an air stream could be further combined, while maintaining the fuel side to have no more than two injectors per heat exchanger. In some embodiments, any suitable number of fuel injectors may be applied. In some embodiments, a 1:1 ratio of heat exchangers to fuel injectors may be applied. In some embodiments, a larger heat exchanger may be applied in the 1:1 ratio arrangement as unconstrained to the nominal dimensions of the fuel injector.

The present disclosure includes heat exchangers that can heat fuel to high temperatures (e.g. greater than 325° F.). However, performing such heat transfer and/or maintaining heated fuel outside of the high pressure core, can increase the risk of uncontrolled/unintended fire. Such heat exchangers can be integrated inside of the high pressure core where size and spatial constraints can arise. Moreover, the present disclosure includes designs which permit the heat exchangers to be easily replaced, without taking the entire engine out of service and/or requiring an engine maintenance facility. Furthermore, limited numbers of heat exchangers in application can limit the ability to shut off the fuel going to one of the heat exchangers, without significantly disrupting the engine's combustion process. Devices, systems, and methods of the present disclosure provide on-line replacement without disruption of engine activities.

Heat exchangers within the present disclosure can be mounted on a separate pad on the outer combustor case. This can enable use of a larger heat exchanger than if directly integrated within the fuel injector. This placement location can enable the heat exchanger to be a Field Replaceable Unit (FRU) and therefore can avoid the need to take the full engine out of service in order to replace the heat exchanger. The heat exchangers of the present disclosure can be formed of a printed circuit design that enables the use of many micro-channels to enhance heat transfer and reduce the overall size of the heat exchanger. In some embodiments, any suitable fabrication methods are possible.

The present disclosure includes fuel lines that contain high temperature fuel being contained within the high pressure core of the engine. This arrangement can reduce the risk of a fuel fire outside of the engine core. For example, the present disclosure includes fuel lines contained within the combustor outer case. Fuel lines can be integrated onto a metal insert that runs from the heat exchanger to the fuel injector. The insert can be welded (or brazed) into a machined pocket on the combustor case.

The present disclosure includes metal O-ring seals and/or knife edge seals which can make it easy to attach (e.g., bolt) the heat exchanger and fuel injector to the combustor case and to still maintain a leak free connection.

In some embodiments, the fuel lines between the heat exchanger and the fuel injector may run on an inner surface of the combustor case, in recessed channels that are formed or machined into the combustor case. In this arrangement the fuel lines could be exposed to the high temperature air within the high pressure cavity. To reduce heat transfer to the fuel along this transport line, radiation shields and flow minimization barriers may be applied to reduce heat transfer to the fuel.

The present disclosure includes designs which can maintain high temperature fuel inside the engine core, reducing the risk and/or the effects of unintended fire; enable the heat exchanger to be a Field Replaceable Unit (FRU) for fast replacement and/or simple; enables additional design space for allowing a larger heat exchanger size; can reduce the number of components (e.g., heat exchanger, valve, etc.) relative to the fuel injector. Designs within the present disclosure may provide improved reliability and reduce costs.

Devices, systems, and methods of the present disclosure can include high pressure valves disposed in the fuel injector to maintain the hot fuel at sufficiently high pressure to avoid two phase flow and/or high density variations that can lead to flow instabilities. An suitable example of such a valve can include the valve 88 as disclosed within U.S. patent application Ser. No. 15/592,777, the disclosure of which is hereby incorporated by reference in its entirety, and including at least those portions directed to fuel-cooled heat exchangers in collaboration with fuel injectors, and/or valve 88 and related.

Devices, systems, and methods of the present disclosure can include leakage detection, a suitable example of such implementation can include a leak detection system using micro-channels as disclosed within U.S. patent application Ser. No. 15/602,576, the disclosure of which is hereby incorporated by reference in its entirety, and including at least those portions directed to fuel-cooled heat exchangers in collaboration with fuel injectors, and/or leak management system (40) and related.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fuel injection assembly for a gas turbine engine comprising
   a high pressure casing defining a high pressure area through which pressurized fluids are passed to a combustion chamber of the gas turbine engine,
   at least one fuel injector including a head mounted to the high pressure casing of the gas turbine engine, and a stem extending from the head into the high pressure area, and a nozzle connected with the stem to inject fuel into the combustion chamber,
   at least one fuel-cooled heat exchanger mounted to the high pressure casing and arranged in fluid communication to receive fuel from a fuel supply of the gas turbine engine, the at least one heat exchanger including a core adapted to pass fuel in thermal communication with a heat source to receive heat, and
   a fuel cavity defined by the high pressure casing, the fuel cavity arranged to receive heated fuel from the at least one heat exchanger and to communicate heated fuel with the head of the at least one fuel injector for injection into the combustion chamber, wherein the fuel cavity is formed as a depression within a wall of the high pressure casing and the high pressure casing includes a cap plate enclosing the fuel cavity.

2. The fuel injection assembly of claim 1, wherein the depression is formed on a radially inner side of the wall of the high pressure casing.

3. The fuel injection assembly of claim 2, wherein the fuel cavity includes a heat shield enclosing an opening of the depression on the radially inner side of the wall.

4. The fuel injection assembly of claim 1, wherein the fuel cavity includes a conduit in communication with each of the at least one heat exchanger and the at least one fuel injector to communicate fuel therebetween, the conduit extending within the fuel cavity of the high pressure casing between the at least one heat exchanger and the at least one fuel injector.

5. The fuel injection assembly of claim 4, wherein the cap plate includes at least one opening in communication with the conduit to pass fuel.

6. The fuel injection assembly of claim 4, wherein at least one of the at least one heat exchanger and the at least one head of the fuel injector is mounted at least partially on the cap plate.

7. The fuel injection assembly of claim 1, wherein at least one of the at least one heat exchanger and the at least one fuel injector is mounted to the high pressure casing on a low pressure side.

8. The fuel injection assembly of claim 7, wherein the at least one heat exchanger includes a fuel passage and an air passage arranged in thermal communication with each other, wherein the air passage is arranged to receive hot, high pressure air from the high pressure area defined by the high pressure casing for providing heat to fuel within the fuel passage.

9. The fuel injection assembly of claim 1, wherein the at least one fuel heat exchanger includes at least two fuel heat exchangers and the at least one fuel injector includes at least four fuel injectors each in communication to receive fuel from one of the at least two fuel heat exchangers, and the fuel injectors are arranged circumferentially about the combustion chamber in alternating sequence such that adjacent ones of the fuel injectors receive fuel from different ones of fuel heat exchangers.

10. The fuel injection assembly of claim 1, wherein the at least one fuel heat exchanger includes at least two fuel heat exchangers, and the assembly further comprises a valve arranged to regulate the flow of air through each of the at least two heat exchangers.

11. A gas turbine engine comprising
an engine core assembly including a compressor for compressing air, a combustor for combusting a mixture of fuel and pressurized air from the compressor, and turbine for expanding combustion products to provide mechanical force, the combustor including a high pressure casing defining a high pressure area and having a combustion chamber arranged within the high pressure area,
at least one fuel injector including a head mounted to the high pressure casing and a stem extending from the head into the high pressure casing, and a nozzle disposed on the stem to inject fuel into the combustion chamber,
at least one fuel-cooled heat exchanger mounted to the high pressure casing and arranged in fluid communication to receive fuel from a fuel supply of the gas turbine engine, the at least one heat exchanger including a core adapted to pass fuel in thermal communication with a heat source to receive heat, and
a fuel cavity defined within a wall of the high pressure casing, the fuel cavity arranged to receive heated fuel from the at least one heat exchanger and to communicate heated fuel with the at least one fuel injector for injection into the combustion chamber, wherein the fuel cavity is formed as a depression within a wall of the high pressure casing and the high pressure casing includes a cap plate enclosing the fuel cavity.

12. The fuel injection assembly of claim 11, wherein the depression is formed on a radially inner side of the wall of the high pressure casing.

13. The fuel injection assembly of claim 12, wherein the fuel cavity includes a heat shield enclosing an opening of the depression on the radially inner side of the wall.

14. The fuel injection assembly of claim 11, wherein the fuel cavity includes a conduit in communication with each of the at least one heat exchanger and the at least one fuel injector to communicate fuel therebetween, the conduit extending within the fuel cavity of the high pressure casing between the at least one heat exchanger and the at least one fuel injector.

15. The fuel injection assembly of claim 14, wherein the cap plate includes at least one opening in communication with the conduit to pass fuel.

16. The fuel injection assembly of claim 14, wherein at least one of the at least one heat exchanger and the at least one head of the fuel injector is mounted at least partially on the cap plate.

17. The fuel injection assembly of claim 11, wherein at least one of the at least one heat exchanger and the at least one fuel injector is secured to the high pressure casing on a low pressure side.

18. The fuel injection assembly of claim 17, wherein the at least one heat exchanger includes a fuel passage and an air passage arranged in thermal communication with each other, wherein the air passage is arranged to receive hot, high pressure air from the high pressure area defined by the high pressure casing for providing heat to fuel within the fuel passage.

19. The fuel injection assembly of claim 11, wherein the at least one fuel heat exchanger includes at least two fuel heat exchangers and the at least one fuel injector includes at least four fuel injectors each in communication to receive fuel from one of the at least two fuel heat exchangers, and the fuel injectors are arranged about the combustion chamber in alternating sequence such that adjacent ones of the fuel injectors receive fuel from different ones of fuel heat exchangers.

20. The fuel injection assembly of claim 11, wherein the at least one fuel heat exchanger includes at least two fuel heat exchangers, and the assembly further comprises a valve arranged to regulate the flow of air through each of the at least two heat exchangers.

* * * * *